(12) United States Patent
Lee et al.

(10) Patent No.: US 6,958,880 B2
(45) Date of Patent: Oct. 25, 2005

(54) DISC DRIVE ACTUATOR PARKING DETECTOR

(75) Inventors: Lucas Lee, Singapore (SG); YuNang Zai, Singapore (SG); James Chang, Singapore (SG); JiaHong Shu, Singapore (SG); PeiKoh Lee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 92 days.

(21) Appl. No.: 10/679,523

(22) Filed: Oct. 6, 2003

(65) Prior Publication Data

US 2005/0073769 A1 Apr. 7, 2005

(51) Int. Cl.⁷ .............................................. G11B 21/02
(52) U.S. Cl. ..................................... 360/75; 360/256.2
(58) Field of Search .............................. 360/69, 75, 31, 360/256, 256.2

(56) References Cited

U.S. PATENT DOCUMENTS

| | | | |
|---|---|---|---|
| 5,313,354 A | | 5/1994 | Sampietro |
| 5,495,376 A | * | 2/1996 | Wasson et al. ................. 360/75 |
| 5,754,357 A | * | 5/1998 | Anderson et al. ............. 360/75 |
| 5,973,887 A | | 10/1999 | Cameron |

* cited by examiner

*Primary Examiner*—Andrew L. Sniezek
(74) *Attorney, Agent, or Firm*—Kirk A. Cesari (57) ABSTRACT

A device for detecting an actuator assembly parking error when a disc drive is powered on includes a magnetic latch attached to the actuator assembly and a latch pin assembly electrically connected to a base plate in the disc drive, where the latch pin assembly is positioned to contact the magnetic latch only when the actuator's read/write head is positioned over a parking zone on the disc. A detection module is electrically connected to the magnetic latch and thus is able to detect whether or not the magnetic latch is contacting the latch pin assembly when the disc drive is powered on. A method for detecting an actuator assembly parking error includes powering on the disc drive, determining whether the magnetic latch has electrical contact with the latch pin assembly, and reporting a parking error if the magnetic latch does not have electrical contact with the latch pin assembly.

22 Claims, 9 Drawing Sheets

DISC DRIVE ACTUATOR PARKING DETECTOR

FIELD OF THE INVENTION

This application relates generally to disc drives and more particularly to a magnetic latch and a method for detecting a failure in the head parking procedure prior to powering up the disc drive.

BACKGROUND OF THE INVENTION

Disc drives are store digital data in magnetic form on a rotating data storage disc. Modern disc drives comprise one or more rigid data storage discs that are coated with a magnetizable medium and mounted on the hub of a spindle motor for rotation at a constant high speed. Information is stored on the discs in a plurality of concentric circular tracks (collectively referred to as the "data region") typically by an array of transducers ("read/write heads") mounted to a radial actuator for movement of the heads in an arc over the surface of the discs. Each of the concentric tracks is generally divided into a plurality of separately addressable data sectors. The read/write heads are used to transfer data between a desired track and an external environment. During a write operation, data is written onto the disc track and during a read operation the head senses the data previously written on the disc track and transfers the information to a host computing system.

The transducers or heads are mounted on sliders via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Rotary actuator assemblies typically employ a voice coil motor to position the heads with respect to the disc surfaces. The actuator voice coil motor includes a coil mounted at one end of the actuator body opposite the actuator arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator assembly thus allows the head to move back and forth in an accurate fashion between an inner diameter (ID) and an outer diameter (OD) of the discs.

A printed circuit board assembly ("PCB"), which is mounted to a bottom surface or base plate of the disc drive, contains a majority of the electronics that are essential to the operation of the disc drive. For example, the PCB includes electrical components that control the speed of the spindle and position of the heads over the discs. Similarly, the PCB also includes electrical components that interface with the host computing system.

When the disc drive is de-energized, the PCB automatically moves the heads to a circumferential storage location or "park" location on the disc surfaces. The park location is typically located about an inner diameter or outer diameter of the data storage region of the disc and is typically called a landing or parking zone. This parking zone typically does not contain any useable data because the transducer physically contacts the disc at rest. Consequently, any data stored in this area would likely be lost or compromised by physical contact with the read/write head. In addition, the parking zone is typically roughened to minimize the stiction of the transducer against the disc surface.

Alternatively, disc drives may utilize load/unload ramps to facilitate removal of the heads from the discs to a parked position adjacent the discs. A load/unload ramp in a disc drive is typically stationary, such that in the process of the actuator assemblies being unloaded from the disc, the heads are moved to the outer rim portion of the discs so that a guide pin extending from the suspension engages the ramp and lifts the heads off the disc surface. The suspension and attached heads then traverse up the load/unload ramps to a park location a safe distance away from the disc surfaces. In the reverse process, the heads are loaded onto the spinning discs by the suspensions and attached heads moving down the stationary ramps and onto the media.

During periods of inactivity (i.e., power down), the fragile magnetic coating on the surface of the disc is susceptible to damage from accidental contact between the head and the data region of the disc if the head is accidentally displaced from the parking zone. Repeated failure to properly park the actuator assembly causes various problems, including scratches to fragile magnetic coating on the discs, damage to the transducers, and stiction between the transducer and the disc during operation, all of which may ultimately lead to a disc drive "crash." Thus, any failure to properly park the actuator assembly in the parking zone when the disc drive is powered down can be detrimental to disc drive performance.

Despite the detrimental effects of such parking errors, most parking failures will not be discovered by a user until the damage is severe, such as where disc sectors have been irreparably damaged or the disc drive crashes. Unfortunately, by this time, the damage is irreversible. Further, without prior notice of potential problems, the user will not have the opportunity to backup or otherwise protect valuable data.

Accordingly there is a need to provide computer users with notice when the actuator assembly does not properly park in the parking zone as a disc drive is powered down. The present invention provides a solution to this and other problems, and offers other advantages over the prior art.

SUMMARY OF THE INVENTION

Against this backdrop the present invention has been developed. An embodiment of the present invention is a device for detecting an actuator assembly parking error when a disc drive is powered on. The actuator assembly is pivotally attached to a base plate in the disc drive and includes a read/write head for accessing data stored on a rotating data storage disc. The disc includes a parking zone for parking the read/write head when the disc drive is powered down. The detection device includes a magnetic latch, a magnetic pin assembly, and a detection module. The latch is attached to an end of the actuator assembly opposite the read/write head. The latch pin assembly is electrically connected to the base plate and positioned to contact the magnetic latch only when the read/write head is positioned over the parking zone. Finally, the detection module is electrically connected to the magnetic latch and thus will be able to detect whether or not the magnetic latch is contacting the latch pin assembly when the disc drive is powered on.

Another embodiment of the present invention is a method for detecting an actuator assembly parking error. After the disc drive is powered on, it is determined whether a magnetic latch attached to an end of the actuator assembly opposite the read/write head has electrical contact with the latch pin assembly that is electrically connected to the base plate and positioned to contact the magnetic latch only when the read/write head is positioned over the parking zone. A parking error is reported if the magnetic latch does not have electrical contact with the latch pin assembly and operation of the disc drive is suspended unless a user opts to override the warning and power up the disc drive.

These and various other features as well as advantages which characterize the present invention will be apparent from a reading of the following detailed description and a review of the associated drawings.

DETAILED DESCRIPTION

Figure 1:
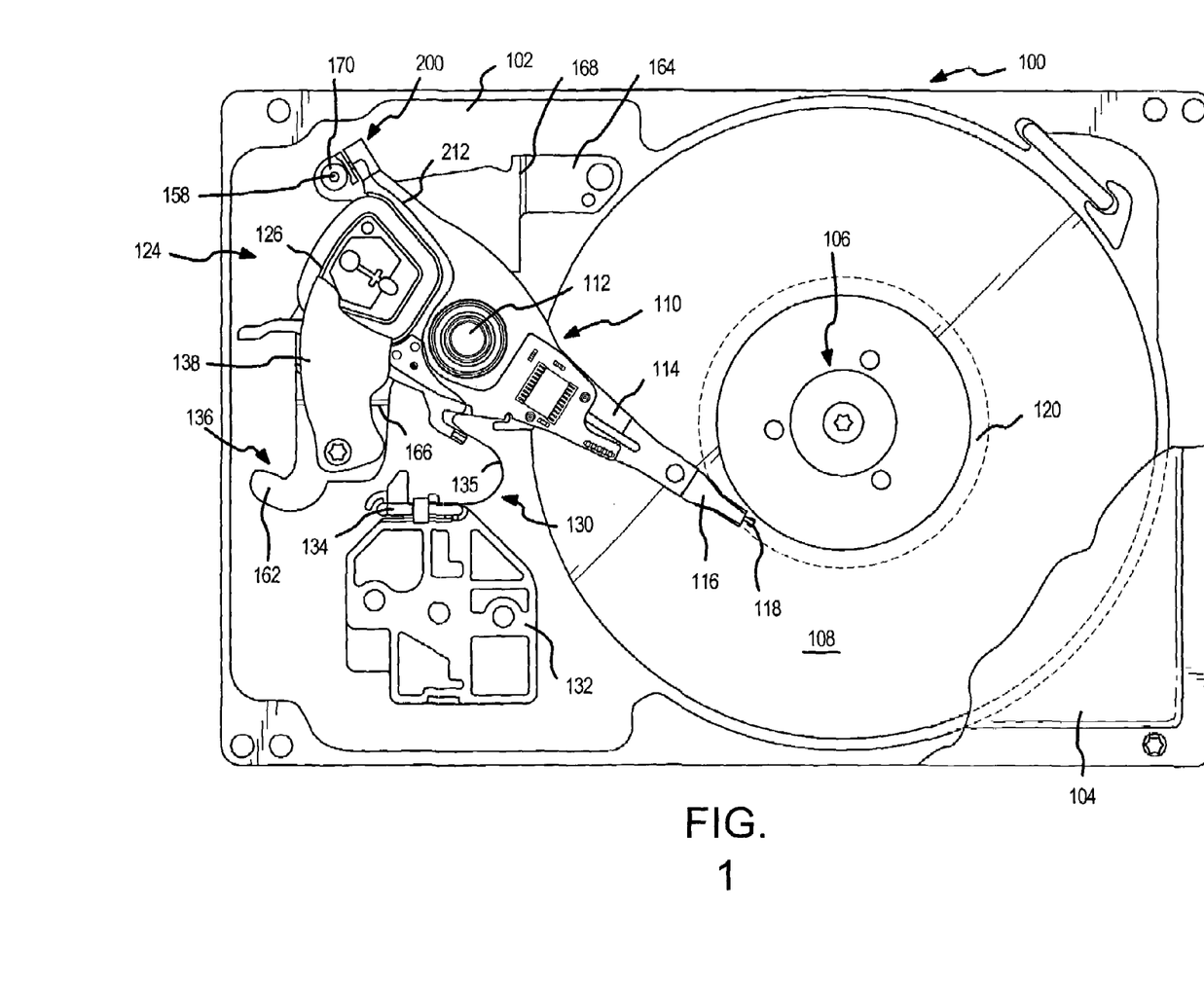
FIG. 1 is a plan view of a disc drive incorporating a preferred embodiment of the present invention showing the cover and top pole partially cut away and the actuator assembly properly parked in a parking zone about the inner diameter of the disc when the disc is powered down.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. The actuator assembly further includes a read/write head 118 mounted at the distal end of each of the flexures 116 on a fluid bearing slider that enables the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 (FIG. 5) that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move over the surfaces of the discs 108.

The spindle motor 106 is typically de-energized when the disc drive 100 is not in use for extended periods of time. The heads 118 are moved over a parking zone 120 comprising a circumferential area about an inner diameter of the discs 108 when the spindle motor 106 is de-energized. The heads 118 are secured over the parking zones 120 through the use of an actuator latch arrangement, described in detail below, which prevents inadvertent rotation of the actuator assembly 110 when the heads 118 are properly parked.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected via a flex cable 135; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The PCB 132 further controls the speed of disc rotation. The flex assembly 130 terminates at a flex bracket 134 for communication through the base plate 102 to the PCB 132, which is mounted to the bottom side of the base plate 102.

The VCM coil 126 is rigidly held in a yoke 140 (FIG. 2) attached to the actuator arms 114 via the bearing assembly 112 of the actuator assembly 110, and the coil 126 is free to rotate horizontally above the magnet 128 and thus to rotate the actuator arms 114. The direction, either clockwise or counter-clockwise, that the coil 126 rotates, is determined by the direction of current passing through the coil 126.

The voice coil motor magnet 128 (FIG. 5) is a flat bipolar magnet that has an arcuate shape with an upper surface divided, preferably equally, into a North pole face (N) and a South pole face (S). The magnet 128 rests on a magnetically permeable bottom pole plate 136, which is fastened to the base 102. An upper pole plate 138 (FIG. 1) lies parallel to and spaced above the bottom pole plate 136.

In the embodiment shown in FIG. 1, the upper pole plate 138 is beneath the cover 104 and therefore within the closed environment between the base plate 102 and cover 104. However, the top pole 138 may be located above the cover 104 and reside in a complementarily shaped depression or recess stamped into the cover 104 such that the upper pole plate 138 is actually outside the closed environment between the cover 104 and the base 102. The cover 104 and the upper pole plate 138 are both made of magnetically permeable material such as steel.

The magnetic flux generated by the magnet 128 passes from one face of the magnet to the magnet's opposite face (flush against the bottom pole plate 136) basically in two closed loops from the magnet 128: from upper face N of the magnet 128, through the gap formed between the upper pole plate 138 and the magnet 128, through the upper pole plate 138 into the end portion of the bottom pole plate 136 against the upper pole plate 138, through the bottom pole plate 136 back to the opposite face of the magnet 128. Flux also passes into the other polarity upper face (S) of the magnet 128, through the magnet 128, through the bottom pole plate 136 to the upper pole plate 138, through the upper pole plate 138, through the gap to the upper face S of the magnet 128 having the opposite polarity.

Figure 5:
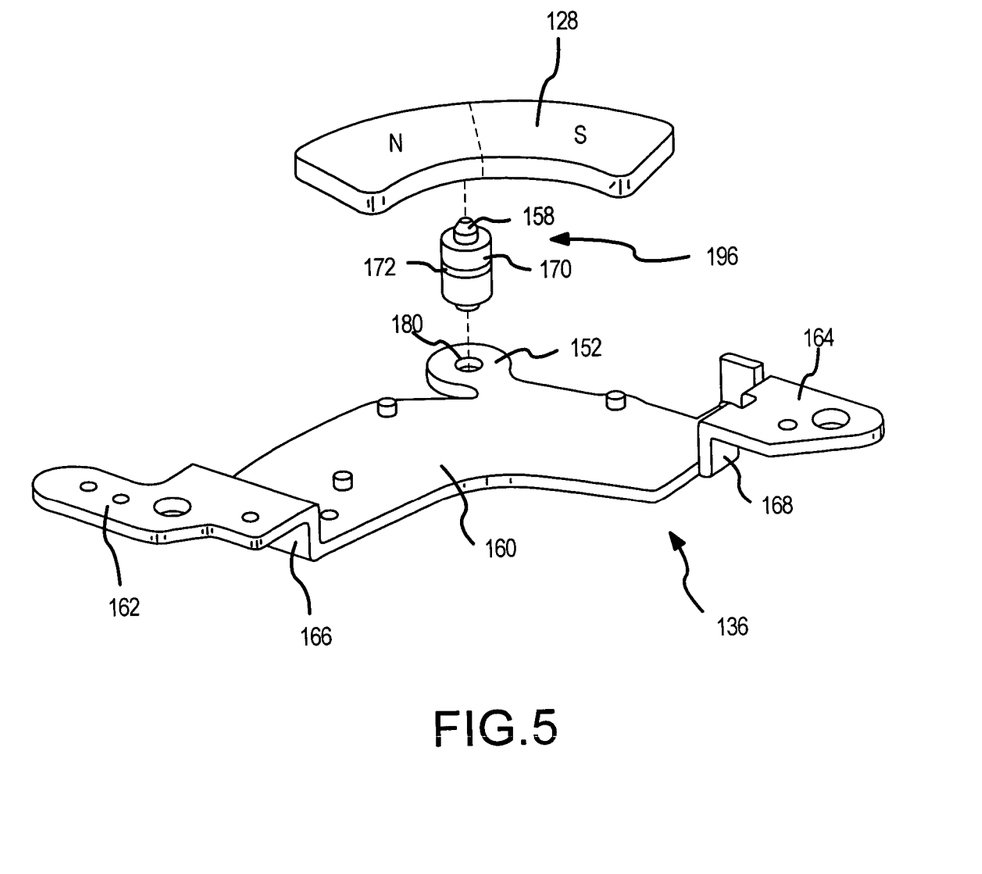
FIG. 5 is an exploded perspective view of a portion of a voice coil motor of the disc drive shown in FIG. 1 illustrating a bottom pole and latch pin assembly in accordance with a preferred embodiment of the present invention.

The bottom pole plate 136 is separately shown in FIG. 5. This bottom pole plate 136 is a generally flat, elongated metal plate, preferably made of steel or other magnetic permeable material, having a flat central magnet support portion 160 between end flange portions 162 and 164. These end flange portions 162 and 164 have upper surfaces parallel to the upper face of the magnet support portion 160 and are spaced from the magnet support portion 160 by bent standoff or riser portions 166 and 168 respectively. These bent riser portions 166 and 168 are preferably bent at a right angle to the magnet support portion 160 and extend upward, each merging with its respective end flange portion 162 or 164. When the steel cover 104 is fastened to the base plate 102 with the upper pole plate 138 in place, the upper pole plate 138 effectively connects the flange portions 162 and 164 of the bottom pole plate 136 through the cover 104 to complete the magnetic circuits described above.

Figure 3:
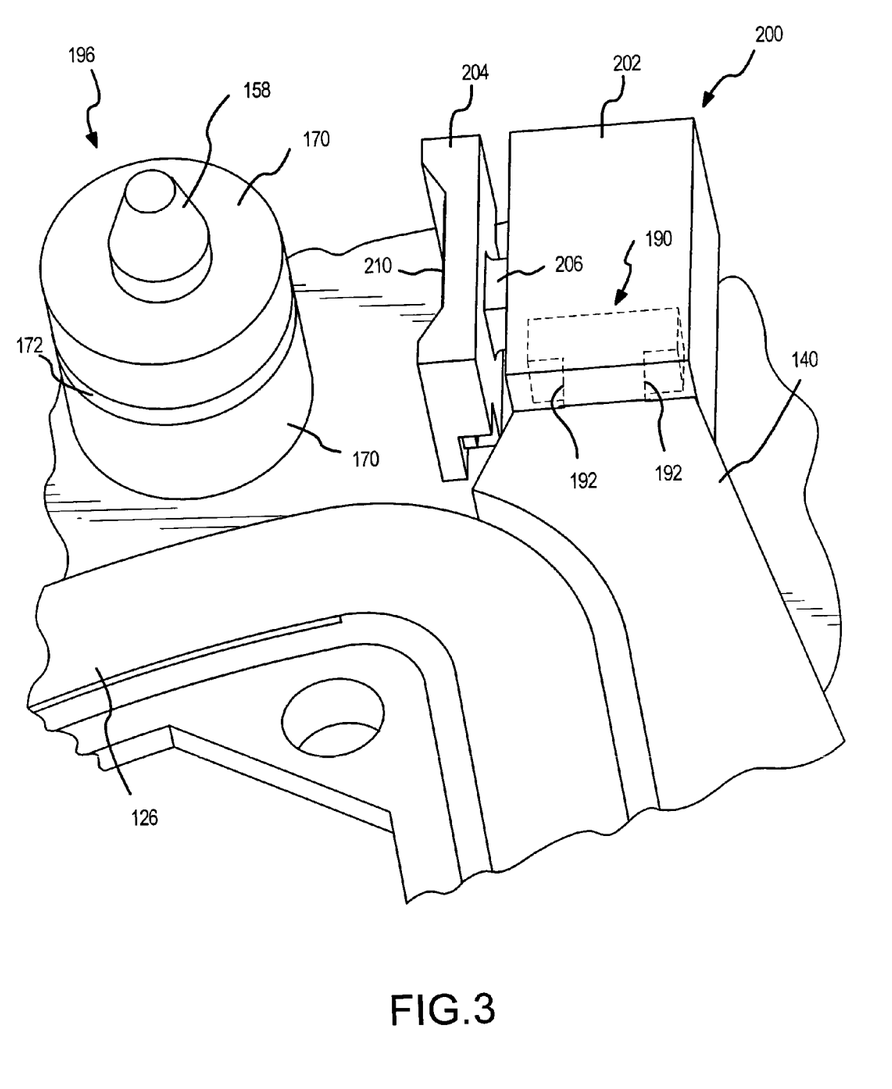
FIG. 3 is an enlarged, top partial perspective view of a magnetic latch and latch pin assembly of the disc drive shown in FIG. 1 in accordance with a preferred embodiment of the present invention.

A magnetic latch apparatus is used to latch the actuator assembly 110 in the parked position at the parking zone 120 when the disc drive is powered down. The latch apparatus involves the use of a pin assembly 196 (FIGS. 3 and 5) attached to the bottom pole plate 136 and a latch 200 connected to the actuator assembly 110. In particular, the bottom pole plate 136 is originally a generally flat magnetically permeable plate. This plate is stamped to form the upright riser portions 166 and 168. The bottom pole 136 has an integral circular tab 152 (FIG. 5) extending outward from a convex outer edge that has a vertical pin 158 extending upward from the tab 152. Positioned on this pin 158 is a latch cylinder 170 that includes a circular peripheral groove 172 to form the pin assembly 196. The groove 172 forms a gap in the cylindrical surface of the latch cylinder 170 which causes a portion of the magnetic flux traveling through the latch cylinder 170 to pass through the air in and adjacent to this gap.

Figure 4:
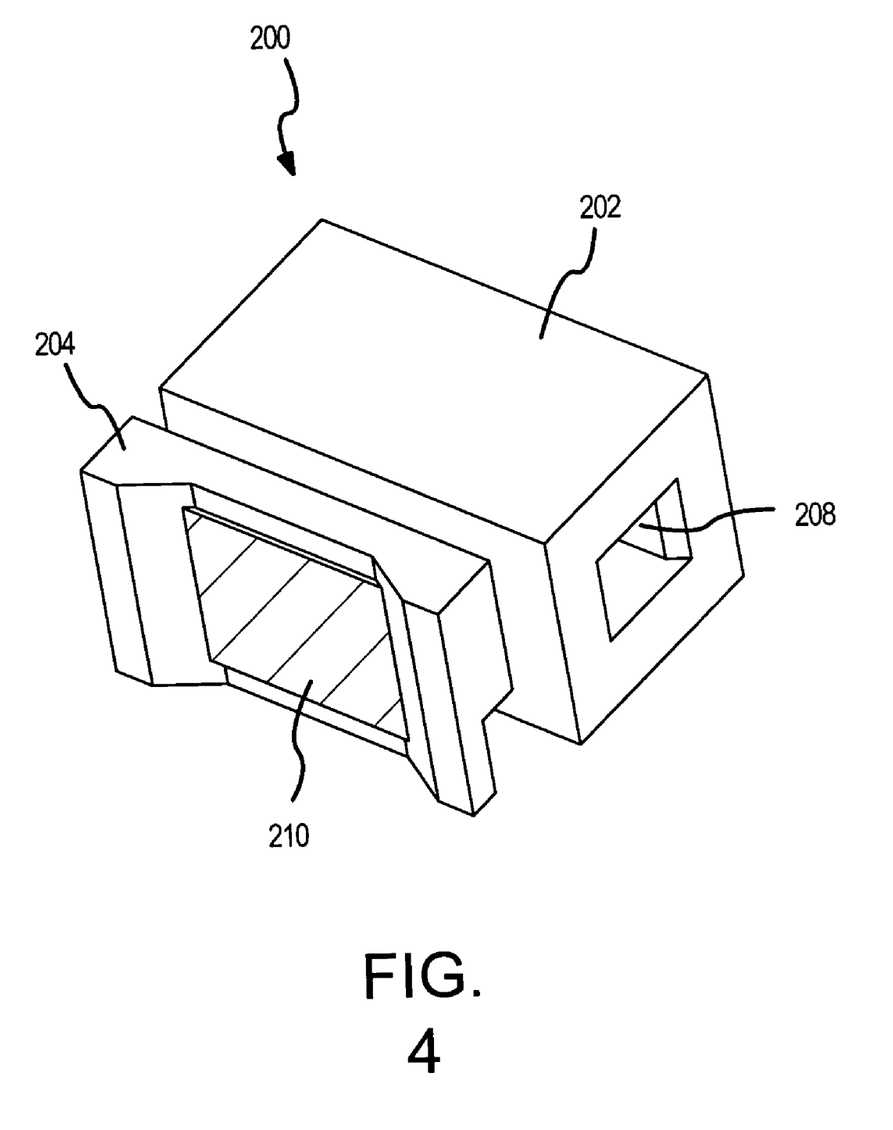
FIG. 4 is a perspective view of the magnetic latch of FIG. 3.

The actuator yoke 140 has a T-shaped latch tab 190 at one end (as shown with dashed lines in FIG. 3) that extends rearward from the yoke 140 and has two lateral indentations 192 for connecting to a latch 200. The latch 200 has a body 202 and a plate 204, as well as a stem 206 attaching the plate 204 to the body 202. The latch body 202 has a T-shaped central opening 208 (FIG. 4) sized to receive and fit snuggly around the latch tab 190. The latch body 202 is preferably made of a flexible material, such as rubber, so that it may be deformed enough to receive the latch tab 190 but maintain a snug connection to the latch tab 190. The latch plate 204 has a contact surface 210 that is made of a magnetically permeable material such as metal. This contact surface 210, when in close proximity to the groove 172, is drawn to and contacts the surface of the latch cylinder 170 over the groove 172 and thus straddles the gap to latch the yoke 140, and hence the actuator assembly 110, in a parked position with the heads 118 on the parking zone 120 of the discs 108.

Figure 2:
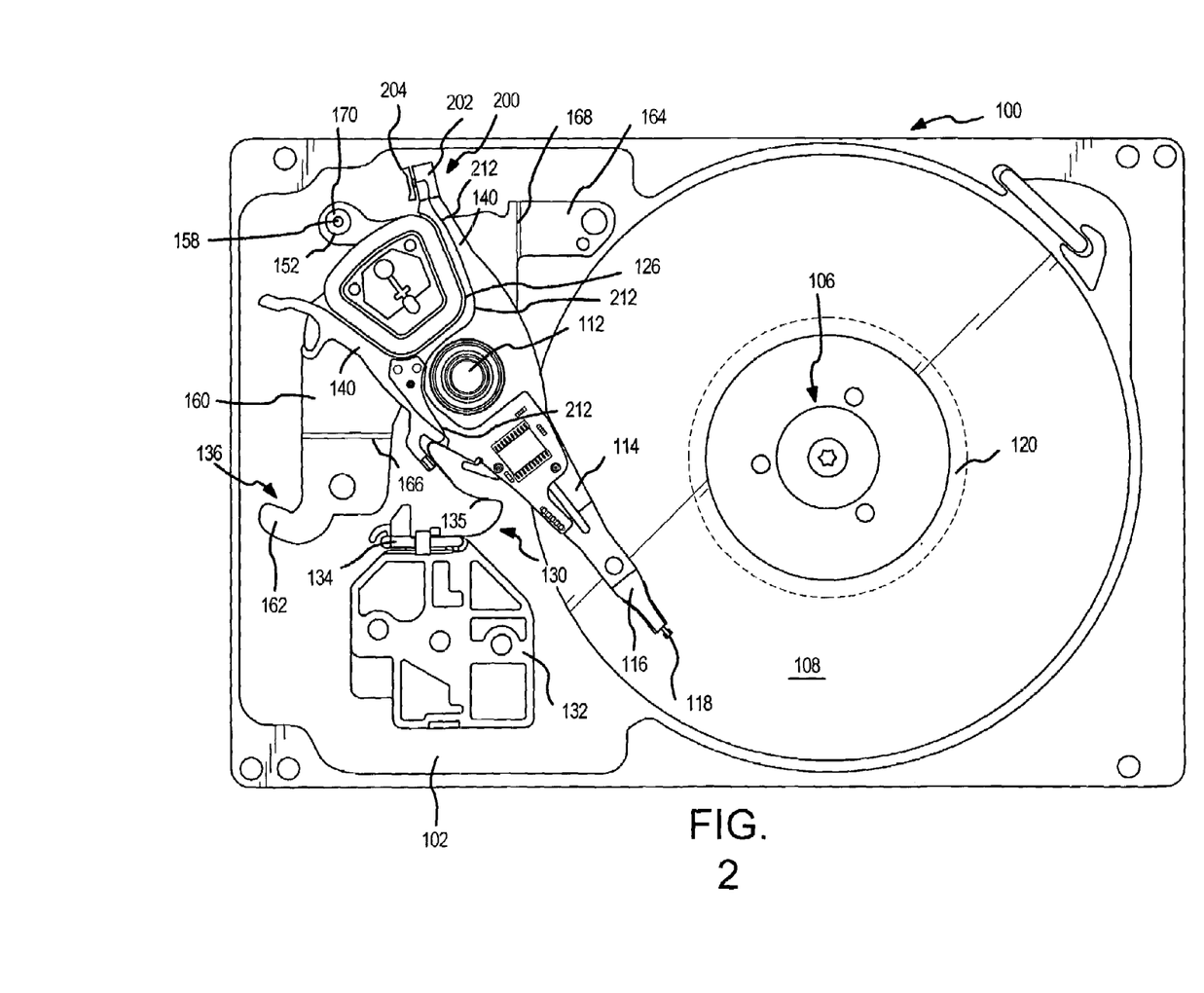
FIG. 2 is a plan view of the disc drive of FIG. 1 with the actuator assembly positioned over the data region of the disc as it would be if the actuator assembly was not properly parked during power down.
Figure 6:
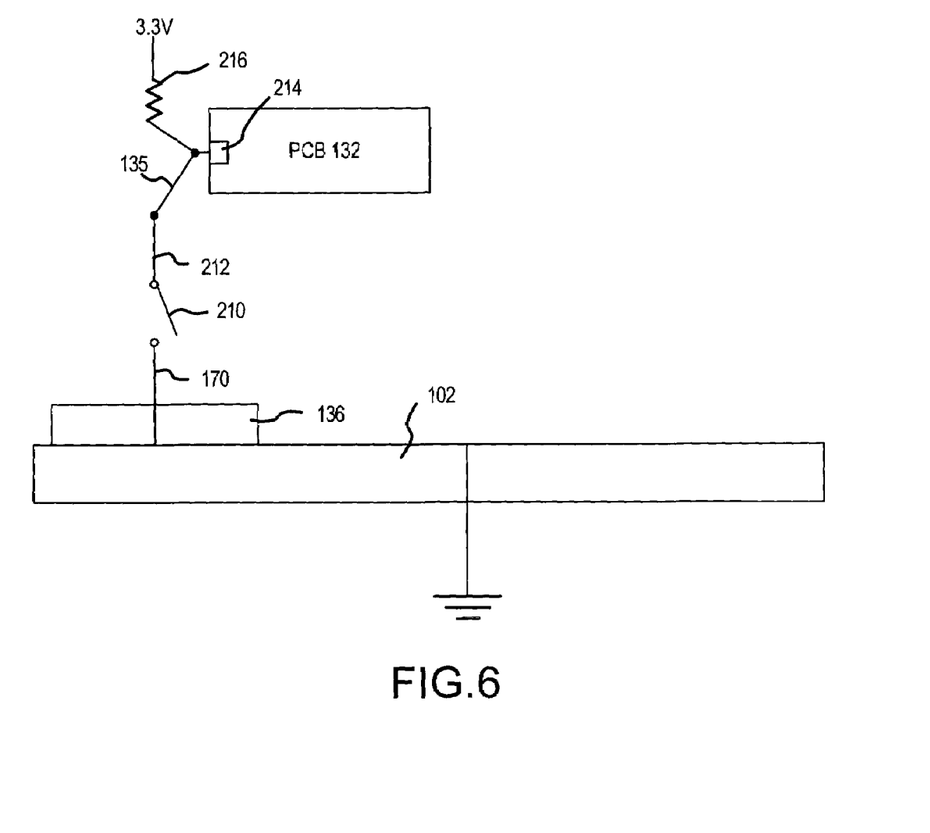
FIG. 6 is a schematic diagram illustrating the connection between the magnetic latch and the PCB in accordance with a preferred embodiment of the present invention.

A head wire 212 electrically connects the contact surface 210 to the flex cable 135, which in turn electrically connects to an input/output port 214 (shown in FIG. 6) on the PCB 132 as shown in FIGS. 1 and 2. A resistor 216, such as a 4.7 kohm resistor, is additionally connected to port 214 to detect whether there is a good electrical connection between the contact surface 210 and the latch cylinder 170, i.e., whether the contact surface 210 is grounded through the latch cylinder 170, where the cylinder 170 is connected to the base plate 102 (electrical ground) via the pin 158 and the bottom pole 136.

As discussed above, when the disc drive is powered down, a controller in the PCB begins to decelerate the rotation of the discs and causes the VCM 124 to pivot the heads 118 toward the parking zone 120 on the inner diameter of the disc. As the heads 118 near the parking zone 120, the contact surface 210 is drawn to and contacts the latch cylinder 170 and thus latches the actuator assembly 110 in a parked position with the heads 110 resting on the parking zone 120 at the inner diameter of the disc 108, where they should remain until the disc drive 100 is powered up again.

Figure 7:
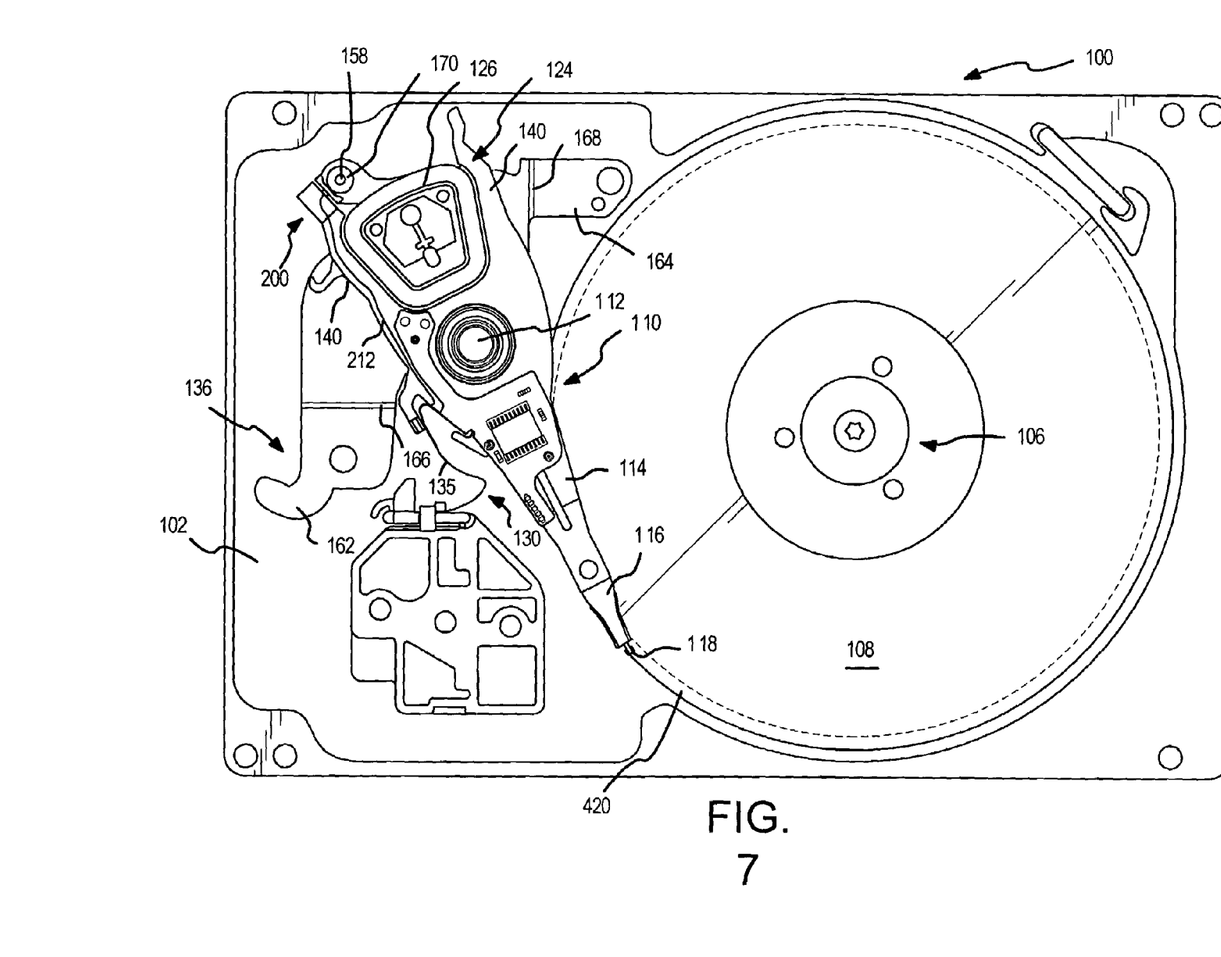
FIG. 7 is a plan view of a disc drive incorporating another preferred embodiment of the present invention showing the actuator assembly properly parked in a parking zone about the outer diameter of the disc when the disc drive is powered down.

FIG. 7 shows another preferred embodiment of the present invention where a parking zone 420 is located in a circumferential area about the outer diameter of the disc as opposed to occupying a circumferential area about the inner diameter of the disc. In this embodiment, the actuator yoke 140 has a T-shaped latch tab (not shown) similar to latch tab 190 on a side opposite of latch tab 190 that likewise extends rearward from the yoke 140 and has two lateral indentations (not shown) similar to indentations 192 for connecting to the latch 200 as shown in FIG. 7. In this embodiment, the latch 200 is rotated 180° from the orientation shown in FIGS. 1 and 2. The contact surface 210, when in close proximity to the groove 172, is drawn to and contacts the surface of the latch cylinder 170 over the groove 172 and thus straddles the gap to latch the yoke 140, and hence the actuator assembly 110, in a parked position with the heads 118 on the parking zone 420 about the outer diameter of the discs 108 when the disc drive 100 is powered down.

Figure 8:
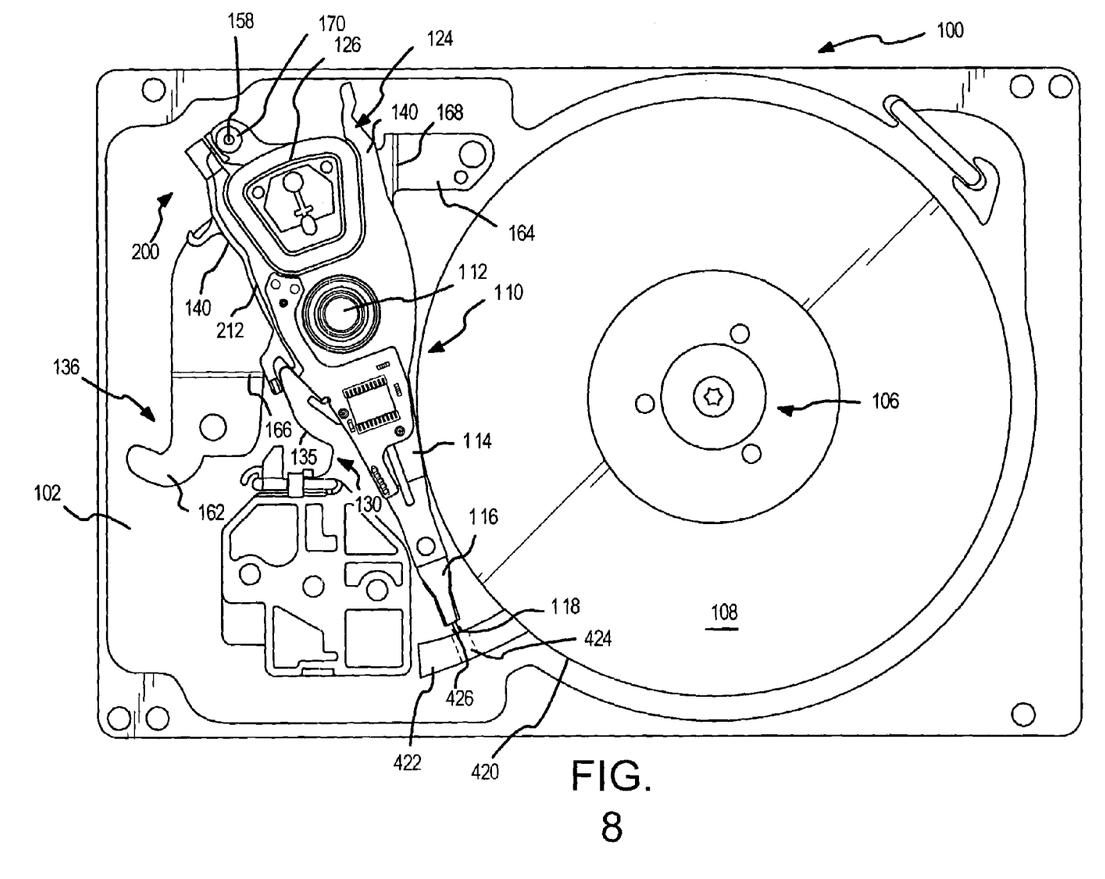
FIG. 8 is a plan view of a disc drive incorporating another preferred embodiment of the present invention showing the actuator assembly properly parked in a parking zone on a load ramp adjacent to the outer diameter of the disc drive when the disc is powered down.

FIG. 8 shows another preferred embodiment of the present invention where a parking zone 424 is located on a ramp 422 adjacent to the outer diameter of the disc 108. Similar to the embodiment shown in FIG. 7, the actuator yoke 140 has a T-shaped latch tab (not shown) similar to latch tab 190 on a side opposite of latch tab 190 that likewise extends rearward from the yoke 140 and has two lateral indentations (not shown) similar to indentations 192 for connecting to the latch 200 as shown in FIG. 8. In this embodiment, the latch 200 is rotated 180° from the orientation shown in FIGS. 1 and 2. When the disc drive 100 is powered down, the actuator assembly is rotated toward the outer diameter of the discs until a guide pin 426 of the actuator assembly 118 contacts the ramp 422. As the guide pin 426 moves up the ramp 422 away from the outer diameter of the disc, the contact surface 210 comes into close proximity to the groove 172. The contact surface 210 is thus drawn to and contacts the surface of the latch cylinder 170 over the groove 172 to latch the yoke 140, and hence the actuator assembly 110, in a parked position with the heads 118 within the parking zone 422 on the ramp 422 when the disc drive 100 is powered down.

A detection process to detect whether the actuator assembly 110 remains properly parked in the parking zones 120 or 420 while the disc drive 100 is powered down may be implemented either through hardware or firmware, i.e., as a computer-readable program which tangibly embodies a program of instructions executable by a computer system, in accordance with embodiments of the present invention. As such, the logical operations of the detection process may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the detection process. Accordingly, the logical operations making up the detection process described herein are referred to variously as operations, structural devices, acts, or detection modules. It will be recognized by one skilled in the art that these operations, structural devices, acts, and modules may be implemented in software, in firmware, in special purpose digital logic, and any combination thereof without deviating from the spirit and scope of the present invention as recited within the claims attached hereto.

Figure 9:
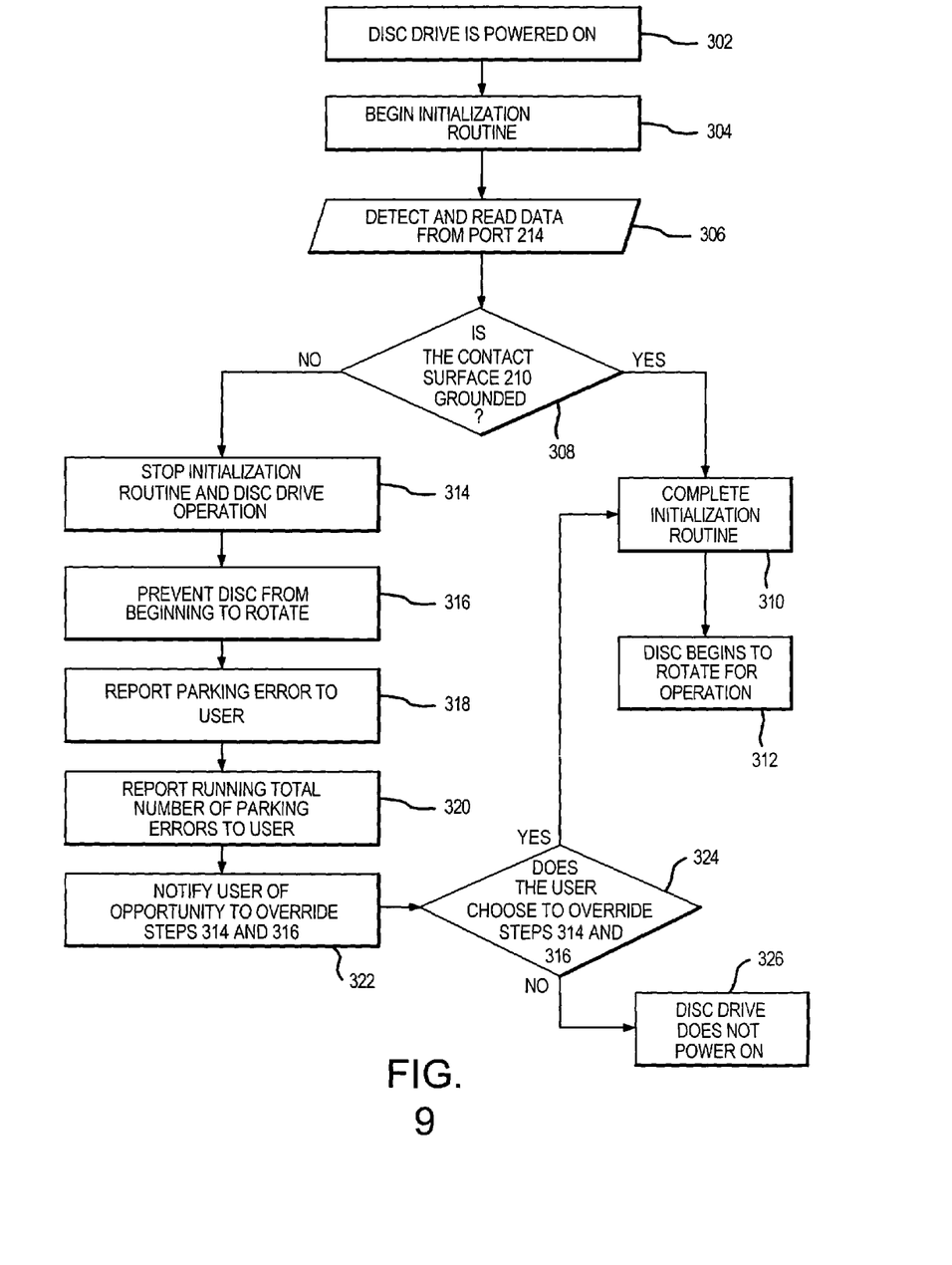
FIG. 9 is a flow chart of the parking detection process in accordance with a preferred embodiment of the present invention.

The detection process is shown in FIG. 9 begins when the disc drive is powered on by step 302 and the host computer processor begins an initialization routine 304 before the discs begin to spin. As part of this initialization routine 304, a detection module will detect and read data from port 214 in step 306 and use this data to determine whether the contact surface 210 of the magnetic latch 200 is grounded in step 308. The latch 200 is grounded if it is contacting the latch cylinder 170 which is electrically connected the base plate (ground), meaning that the actuator assembly 110 is properly parked in the parking zone 120. If the data indicates that the contact surface 210 is grounded, the detection process 300 proceeds to step 310 where the initialization routine is completed and then to step 312 where the discs 108 begin to rotate for disc drive operation.

If, however, it is determined at step 308 that the magnetic latch 200 is not grounded, that is that the contact surface 210 is not touching the latch cylinder 170 and there is a "parking error," the detection process 300 proceeds instead to step 314 where the initialization routine is stopped and then to step 316 where the discs 108 are prevented from beginning to spin. The detection process 300 next proceeds to step 318 where rather than finishing the initialization routine, the failure of the actuator assembly to properly park is reported to the disc drive user through a self-monitoring and reporting technology feature. Because the discs 108 do not begin to spin if the actuator assembly 110 was not properly parked, the risk of damage to the disc drive 100 is substantially reduced. Further, the user will receive early notice that the disc drive 100 needs to be serviced before it is used again thereby increasing the chance that valuable data will not be lost.

The detection process stores the running total number of parking errors that have occurred with the disc drive 100 and in step 320 this total number of parking errors is reported to the user. The detection process next notifies the user that at step 322 that there is an opportunity to override steps 314 and 316. If the user chooses at decision 324 to override steps 314 and 316, then the detection process 300 proceeds to steps 310 and 312 and the disc drive 100 finishes initialization and powers on. If the user chooses not to override steps 314 and 316, the disc drive 100 will not power on until it is serviced.

In summary, a device for detecting an actuator assembly (such as 110) parking error may be implemented in a disc drive (such as 100) with actuator assembly (such as 110) that is pivotally attached to a base plate (such as 102) and includes a read/write head (such as 118) for accessing data stored on a rotating data storage disc (such as 108) with a parking zone (such as 120 and 420) for parking the read/write head (such as 118) when the disc drive (such as 100) is powered down. The device includes three elements: a magnetic latch (such as 200), a latch pin assembly (such as 196), and a detection module. The magnetic latch (such as 200) is attached to the actuator assembly (such as 110) opposite the read/write head (such as 118). The latch pin assembly (such as 196) is electrically connected to the base plate (such as 102) and positioned to contact the magnetic latch (such as 200) only when the read/write head (such as 118) is positioned over the parking zone (such as 120 and 420). The detection module is electrically connected to the magnetic latch (such as 200) for detecting contact between the magnetic latch (such as 200) and the latch pin assembly (such as 196) when the disc drive (such as 100) is powered on. The detection module may further report (such as 214) a parking error if there is no contact between the magnetic latch (such as 200) and the latch pin assembly (such as 196) when the disc drive (such as 100) is powered on and store a running total number of parking errors. Further, the detection module may prevent rotation of the disc (such as 108) if there is no contact between the magnetic latch (such as 200) and the latch pin assembly (such as 196) when the disc drive (such as 100) is powered on. A resistor (such as 216), such as a resistor (such as 216) that measures approximately 4.7 kohms, may be electrically connected to the magnetic latch (such as 200) and the detection module. The parking zone (such as 120 and 420) may be a circumferential area located about an inner diameter (such as 120) of the disc (such as 108) or an outer diameter (such as 420) of the disc (such as 108). A ramp (such as 422) may be attached to the base plate (such as 102) adjacent to the outer diameter (such as 420) of the disc (such as 108) for parking the read/write head (such as 118).

The magnetic latch (such as 200) includes a latch body (such as 202) and a latch plate (such as 204) having a contact surface (such as 210) made of magnetically permeable material that contacts the latch cylinder (such as 170) when the read/write head (such as 118) is positioned over the parking zone (such as 120 and 420). The latch body (such as 202) and latch plate (such as 204) may be made of a non-magnetically permeable material. The latch pin assembly (such as 196) comprises a pin (such as 158) extending upward from the base plate (such as 102) and a latch cylinder (such as 170) positioned on the pin (such as 158), so that the magnetic latch (such as 200) contacts the latch cylinder (such as 170) when the read/write head (such as 118) is positioned over the parking zone (such as 120 and 420). The latch cylinder (such as 170) may include a circular peripheral groove (such as 172) that forms a gap in the cylindrical surface of the latch cylinder (such as 170) so that the contact surface (such as 210) of the magnetic latch (such as 200) spans the gap when the read/write head (such as 118) is positioned over the parking zone (such as 120 and 420).

The actuator assembly (such as 110) further includes a voice coil motor (such as 124) having a bottom pole plate (such as 136) attached to the base plate (such as 102), a top pole plate (such as 138) attached to the bottom pole plate (such as 136), and a coil (such as 126) attached to the actuator assembly (such as 110) and positioned between the top pole plate (such as 138) and the bottom pole plate (such as 136). The latch pin assembly (such as 196) may be attached to the bottom pole plate (such as 136) and the top pole plate (such as 138).

A method for detecting an actuator assembly (such as 110) parking error in a disc drive (such as 100) includes three steps. First, the disc drive (such as 100) is powered on (such as 302). Next, it is determined whether a magnetic latch (such as 200) attached to an end of the actuator assembly (such as 110) opposite the read/write head (such as 118) has electrical contact with a latch pin assembly (such as 196) electrically connected to the base plate (such as 102) where the magnetic latch (such as 200) contacts the latch pin assembly (such as 196) only when the read/write head (such as 118) is positioned over the parking zone (such as 120 and 420) (such as 304 and 306). Next, a parking error is reported (such as 214) if there is no contact between the magnetic latch (such as 200) and the latch pin assembly (such as 196) (such as 318). Additionally, the disc (such as 108) may be prevented from rotating if the magnetic latch (such as 200) does not have electrical contact with the latch pin assembly (such as 196) (such as 314 and 316), however the user may override this step after the parking error has been reported (such as 322 and 324). The running total number of parking errors may be stored (such as 320). A processor having a port (such as 214) electrically connected to the latch may read data from the port (such as 214) to determine whether the magnetic latch (such as 200) has electrical contact with the latch pin assembly (such as 196).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the magnetic latch may be made a different size or shape or made of a different material so long as the contact surface is made of a magnetically permeable material. Alternatively, the parking zone may be positioned in alternative locations so long as the head is parked in a position where it will not risk damage to the data stored on the disc. Numerous other changes may be made which will readily suggest themselves to those skilled in the art and which are encompassed in the spirit of the invention disclosed and as defined in the appended claims.

What is claimed is:

1. A device comprising:
   an actuator assembly;
   a read/write head coupled to the actuator assembly;
   a rotating data storage disc having a parking zone;
   a magnetic latch attached to the actuator assembly;
   a latch pin assembly positioned to contact the magnetic latch only when the read/write head is positioned over the parking zone; and
   a detection circuit operably connected to detect contact between the magnetic latch and the latch pin assembly.

2. The device of claim 1 wherein the detection circuit reports a parking error if there is no contact between the magnetic latch and the latch pin assembly when the disc drive is powered on.

3. The device of claim 2 wherein the detection circuit stores a running total number of parking errors.

4. The device of claim 1 wherein the detection circuit prevents rotation of the disc if there is no contact between the magnetic latch and the latch pin assembly when the disc drive is powered on.

5. The device of claim 1 further comprising a resistor electrically connected to the magnetic latch and the detection circuit.

6. The device of claim 1, wherein the detection circuit further comprises a processor.

7. The device of claim 1 wherein the parking zone is a circumferential area located about an inner diameter of the disc.

8. The device of claim 1 wherein the parking zone is a circumferential area located about an outer diameter of the disc.

9. The device of claim 8 further including a ramp attached to the base plate adjacent to the outer diameter of the disc for parking the read/write head.

10. The device of claim 1 wherein the latch pin assembly comprises a pin extending upward from a base plate and a latch cylinder positioned on the pin, and wherein the magnetic latch contacts the latch cylinder when the read/write head is positioned over the parking zone.

11. The device of claim 10 wherein the magnetic latch comprises a latch body and a latch plate, wherein the latch plate includes a contact surface made of magnetically permeable material that contacts the latch cylinder when the read/write head is positioned over the parking zone.

12. The device of claim 11 wherein the latch cylinder includes a circular peripheral groove that forms a gap in the cylindrical surface of the latch cylinder, and wherein the contact surface of the magnetic latch spans the gap when the read/write head is positioned over the parking zone.

13. The device of claim 1 wherein the actuator assembly further includes a voice coil motor comprising:
   a bottom pole plate attached to a base plate;
   a top pole plate attached to the bottom pole plate; and
   a coil attached to the actuator assembly and positioned between the top pole plate and the bottom pole plate, wherein the latch pin assembly is attached to the bottom pole plate and the top pole plate.

14. The device of claim 1 wherein the magnetic latch comprises a latch body and a latch plate, wherein the latch plate includes a contact surface made of magnetically permeable material.

15. The device of claim 14 wherein the latch body and latch plate comprise a non-magnetically permeable material.

16. A method for detecting an actuator assembly parking error in a disc drive comprising:
   determining whether a magnetic latch has electrical contact with a latch pin assembly.

17. The method of claim 16 further comprising:
   preventing a data storage disc from rotating if the magnetic latch does not have electrical contact with the latch pin assembly, wherein the magnetic latch contacts the latch pin assembly only when the read/write head is positioned over the parking zone.

18. The method of claim 17 further comprising:
   reporting a parking error if there is no contact between the magnetic latch and the latch pin assembly; and
   allowing the user to override the preventing after the parking error has been reported.

19. The method of claim 16 further comprising:
   storing a running total number of parking errors.

20. The method of claim 16 wherein the disc drive includes a processor having a port electrically connected to the latch and the determining step further comprises reading data from the port to determine whether the magnetic latch has electrical contact with the latch pin assembly.

21. A disc drive comprising:
   an actuator assembly pivotally attached to a base plate;
   a read/write head attached to an end of the actuator assembly for accessing data stored on a rotating data storage disc, wherein the disc includes a parking zone for parking the read/write head when the disc drive is powered down; and detection means electrically connected to the actuator assembly for detecting whether the read/write head is parked in the parking zone when the disc drive is powered on.

22. The device of claim 21 wherein the detection means further comprises:

a magnetic latch attached to the actuator assembly opposite the read/write head;

a latch pin assembly electrically connected to the base plate and positioned to contact the magnetic latch only when the read/write head is positioned over the parking zone; and a detection module electrically connected to the magnetic latch for detecting contact between the magnetic latch and the latch pin assembly when the disc drive is powered on.

* * * * *